United States Patent [19]

Saatkamp et al.

[11] Patent Number: 5,106,546
[45] Date of Patent: Apr. 21, 1992

[54] METHOD OF TESTING THE OPERATIVE CONDITION OF DIES PROVIDED WITH COOLING SECTIONS

[75] Inventors: Richard Saatkamp, Lengerich; Dieter Borgmann, Mettingen, both of Fed. Rep. of Germany

[73] Assignee: Windmoller & Holscher, Lengerich, Fed. Rep. of Germany

[21] Appl. No.: 487,065

[22] Filed: Mar. 5, 1990

[30] Foreign Application Priority Data

Mar. 6, 1989 [DE] Fed. Rep. of Germany ....... 3907180

[51] Int. Cl.$^5$ .............................................. B29C 47/92
[52] U.S. Cl. ...................................... 264/40.1; 73/37; 73/40; 137/12; 137/557; 137/624.13; 137/624.18; 264/40.3; 264/40.6; 264/211.12; 264/564; 364/473; 364/509; 364/510; 364/558; 425/135; 425/143
[58] Field of Search .................... 264/40.1, 40.3, 40.6, 264/211.12, 211.13, 237, 564, 348; 73/37, 40, 40.5 R, 46; 425/72.1, 135, 141, 143, 144, 326.1, 378.1, 445; 364/468, 469, 473, 506, 509, 510, 550, 550.01, 557, 558, 559; 137/2, 12, 14, 487.5, 551, 557, 624.11, 624.13, 624.18, 884

[56] References Cited

U.S. PATENT DOCUMENTS 4,246,212  1/1981  Upmeier et al. .................. 264/40.1
4,699,580 10/1987  Co .................................. 264/40.1 X

FOREIGN PATENT DOCUMENTS 63-163134  7/1988  Japan .................................. 73/40

*Primary Examiner*—Leo B. Tentoni
*Attorney, Agent, or Firm*—Fleit, Jacobson, Cohn, Price, Holman & Stern

[57] ABSTRACT

A method is described in which the operative condition of the cooling sections of a slot die for making flat films of thermoplastic material, or of an annular die of a blow molding extruder for making tubular films from synthetic thermoplastics, is tested. The cooling sections are provided with lines for supplying and discharging cooling air and the lines for supplying cooling air are connected, as required, to a central cooling air feed line, which is under superatmospheric pressure, by solenoid valves controlled by an electronic computer. In one embodiment of the invention, a testing program is performed in which the cooling air feed line is disconnected by a shut-off valve from the branch lines leading to respective solenoid valves when the latter are closed. A pressure detector disposed in the cooling air feed line is then used to measure the pressure and the pressure drop which occurs in the cooling air feed line upon the opening of the solenoid valve associated with the first cooling section that is to be tested. An error signal is generated when the pressure and the measured pressure drop do not correspond to values which are typically obtained in case of proper operations of the cooling air feed line and of the cooling section being tested. All cooling sections are subsequently tested, in succession, by closing all solenoid valves and the shut-off valve and opening only the solenoid valve associated with the cooling section to be tested during the testing interval.

2 Claims, 2 Drawing Sheets

METHOD OF TESTING THE OPERATIVE CONDITION OF DIES PROVIDED WITH COOLING SECTIONS

BACKGROUND OF THE INVENTION

1. Field of the Invention

This invention relates, in the first place, to a method of testing the operative condition of cooling sections of a slot die for making flat films of thermoplastic material. The cooling sections are provided with lines for supplying and discharging cooling air, and the lines for supplying cooling air are connected, as required, to a central cooling air feed line. The feed line is under superatmospheric pressure, supplied through solenoid valves controlled by an electronic computer.

This invention relates also to a method of testing the operative condition of cooling sections of an annular die of a blow molding extruder for making tubular films from synthetic thermoplastics. The cooling sections are provided with lines for supplying and withdrawing cooling air, and the lines for supplying cooling air are connected to a central cooling air feed line. The feed line is under superatmospheric pressure, supplied through solenoid valves which are controlled by an electronic computer.

2. Description of the Prior Art

In the production of flat films and blow molded tubular films, it is known to provide a slot die or annular die with cooling sections, which, in response to a measured deviation of thickness of the extruded film from the average film thickness, are temporarily supplied with cooling air to ensure that the extruded film will have a uniform thickness over its width or over its periphery. In the production of flat films, die sections will be cooled wher excessively thick film portions have been extruded therefrom. In blow molding tubular films, the annular extrusion die will be, at least temporarily, cooled in those sections from which film portions have been extruded which are too thin after the film has been inflated. These methods are known for a control of the production of flat and tubular films having a good average thickness distribution.

A slot die for making a flat film or an annular die for making a blown film is divided into numerous cooling sections, which must individually be supplied with cooling air when needed. Disturbances may occur, however, at individual or several cooling sections, and satisfactory operation of individual cooling sections may no longer be ensured. It was previously impossible to detect disturbances at individual cooling sections unless a failure of the automatic control was noticed. Moreover, it is usual for the machine operator to check the operation of the solenoid valves by feeling the flexible tubes which lead from respective solenoid valves to the slot die or to the film blowing head. Because the flexible supply tubes are relatively thin-walled, opening a valve will result in a slight bulge in the flexible supply tube, and that bulge can be felt. Some valves, however, may be opened rather frequently, and others may hardly be opened, so that the check, which is manually performed by the machine operator, is rather inaccurate and takes much time.

SUMMARY OF THE INVENTION

For this reason, it is an object of the invention to provide a method by which the operative condition of the cooling sections of slot dies and annular dies for producing plastic films can reliably be tested in simple manner.

In a method of the kind described above, i.e., a method for testing the operative condition of the cooling sections of a slot die, that object is accomplished in accordance with this invention by a testing program which is performed with the cooling air feed line disconnected, by a shut-off valve, from the branch lines leading to respective solenoid valves when the latter are closed. A pressure detector, disposed in the cooling air feed line, is then used to measure the pressure and the pressure drop which occurs in the cooling air feed line upon the opening of the solenoid valve associated with the first cooling sections to be tested. An error signal is generated when the pressure and the measured pressure drop do not correspond to the values which are typically obtained in case of proper operations of the cooling air feed line and of the cooling section being tested. All cooling sections are subsequently tested in succession in that all solenoid valves are closed, the shut-off valve is closed, and only the solenoid valve associated with the cooling section to be tested is opened during the testing interval. The testing program in accordance with the invention can be controlled in a simple manner by a special computer program. Because the testing program can be performed under the control of a computer within a relatively short time, continuous production will not be disturbed by the performance of the testing program. The testing program can be carried out after a suitable interval of time, e.g., after an interval of two hours.

When the shut-off valve has been closed during the testing program in accordance with the invention, a test is made as to whether the cooling air feed line and the cooling air supply lines branching from that feed line, as well as the solenoid valves for controlling respective cooling air supply lines, are air-tight. A leak will be indicated by a premature pressure drop. When a solenoid valve is subsequently opened for a test of the function of a cooling section, the measured pressure drop will indicate whether that cooling section operates satisfactorily.

The pressure detector delivers signals indicating the measured pressure drop to the computer and can be used to determine the rate of pressure drop, which can than be compared with stored values which are typical for a satisfactory function.

The pressure detectors may consist of pressure sensors or of pressure-responsive switches, which permit a sufficiently exact detection of the pressure drop.

In a method of the kind described above for testing the operative condition of the cooling sections of an annular die, the object set forth is accomplished in accordance with the invention by a testing program in which a vent valve, which is associated with each or all cooling air discharge lines, is closed and the solenoid valve associated with the cooling section to be tested is opened, a pressure detector, which is connected to the cooling air discharge line of the cooling section to be tested, is used to measure the pressure rise in that discharge line, an error signal is generated if the measured pressure rise is not typical of a satisfactory function of the cooling section to be tested and the associated cooling air supply and discharge lines, and then the cooling air discharge lines are vented and all solenoid valves are consecutively opened, and the functions of the associated cooling sections are tested by measuring the pressure rise in the cooling air discharge line. Whereas in the first method in accordance with the invention, the pressure drop, in a shut-off part of the cooling air feed line, is measured, in the second embodiment of the invention, the pressure rise which occurs in the cooling air discharge line when it has been vented and subsequently closed and when the solenoid valve is opened which supplies cooling air to the associated cooling section is measured.

Upon proper adaptation, either of the two embodiments of the invention which have been described can be used for a functional test of the cooling sections of slot dies and of annular dies. The two embodiments of the invention are merely described with reference to a slot die and to an annular die, respectively, although such applications can be interchanged.

DETAILED DESCRIPTION OF THE PREFERRED EMBODIMENTS

Illustrative embodiments of the invention will now be described, in detail, with references to the drawings.

Figure 1:
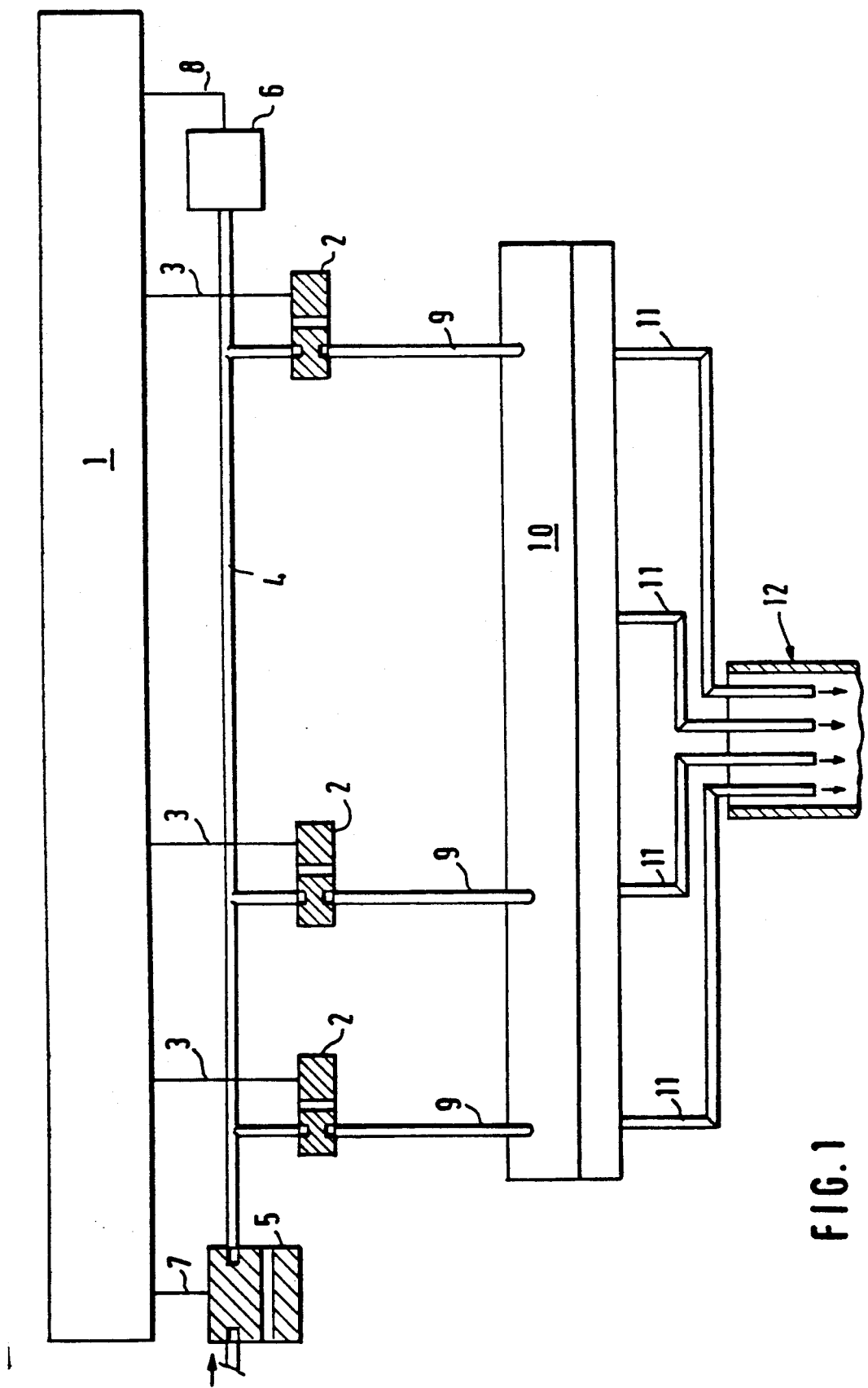
FIG. 1 is a diagrammatic view showing a slot die provided with means for testing the operative condition of the cooling sections of the die.

In the embodiment shown in FIG. 1, an electronic computer 1 is serially connected, via signal lines 3, to solenoid valves 2. Conventional slot dies comprise 132 cooling sections, with which 132 solenoid valves 2 are associated.

All valves 2 communicate with a compressed air line 4, which is connected at its air inlet end to a control valve 5, and at its air outlet end to a pressure-responsive switch 6. The control valve 5 and the pressure-responsive switch 6 are connected to the computer 1 by signal lines 7 and 8, respectively. In a known manner, the computer 1 is programmed to actuate associated solenoid valves 2 in response to signals which are delivered to the computer and indicate thickness deviations of the film, and to blow cooling air through lines 9 into the slot die head 10 at locations where required. Through air discharge lines 11 and an air discharge manifold 12, which is connected to all lines 11, that cooling air is discharged into the atmosphere.

In addition to operating in accordance with the known program, the computer 1 is controlled to interrupt the automatic thickness control after regular intervals of time, e.g., of two hours, and then to perform a program by which air is supplied to all 132 lines 9 in succession and after a short interval of time also to the associated solenoid valves 2. For that purpose, the control valve 5 is opened for a short time by a signal delivered via the line 7 to admit air under a pressure of about 2 bars to the line 4. The pressure-responsive switch 6 responds to that pressure. The first solenoid valve on the left in the drawing is then opened in response to a signal delivered via the line 3 so that the pressure-responsive switch 6 responds to the pressure drop in the line 4 and thus indicates a proper function of the solenoid valve which is being tested. The cycle which has just been described is repeated for all 132 solenoid valves. It has been found in practice that the resulting cooling of consecutive portions of the slot die head 10 for short periods of time will not affect the quality of the flat film. When all solenoid valves 2 have been tested, the computer 1 resumes its normal program for the automatic control of the thickness of the extruded flat film.

Figure 2:
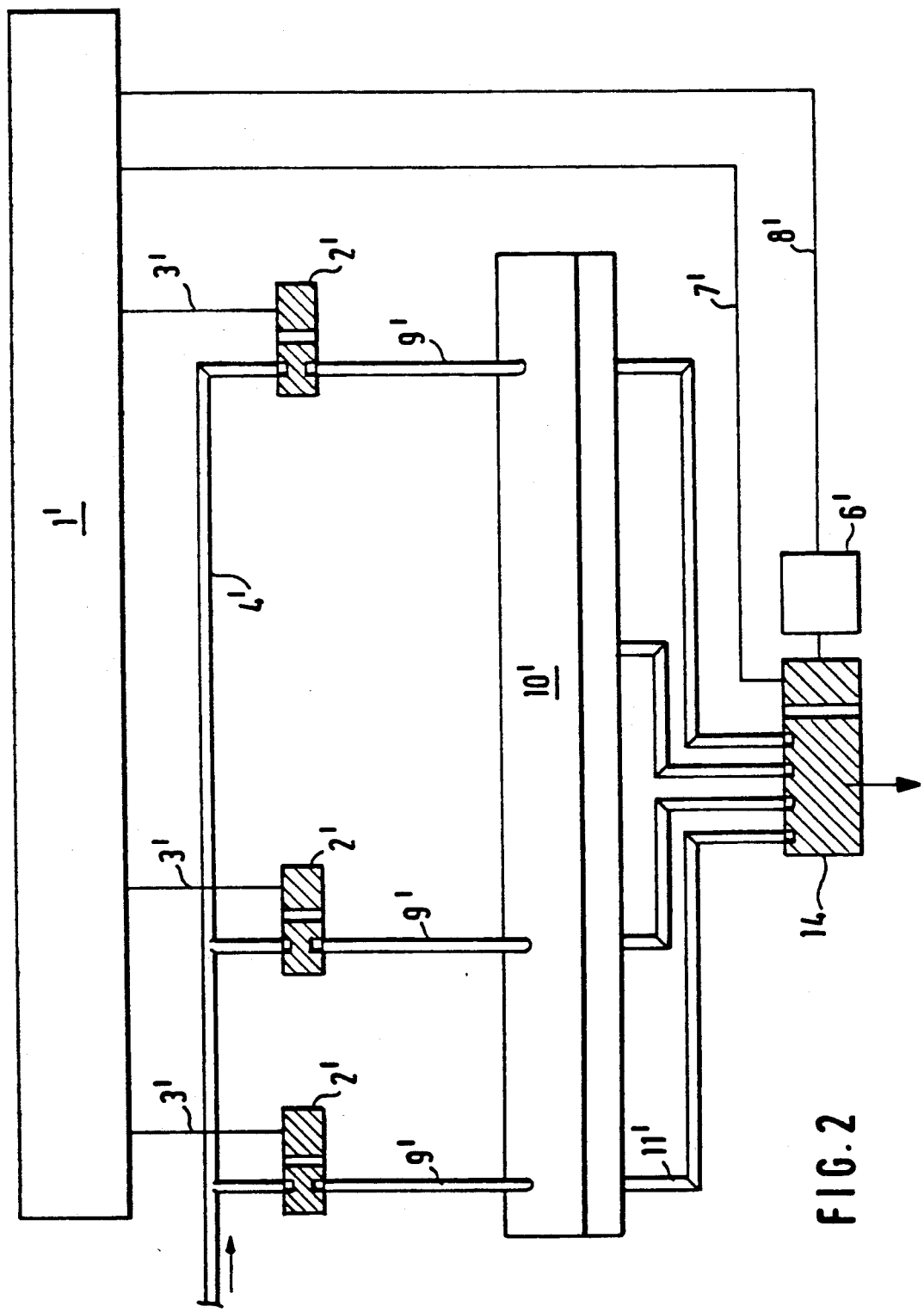
FIG. 2 is a diagrammatic view showing an annular die which is provided with means for testing the satisfactory function of the cooling sections of the die.

The arrangement shown in FIG. 2 serves to test the solenoid valves 2' of extruders for making tubular film and for testing also the air-tightness of the flexible lines 9'. For that purpose, the line 4' is constantly supplied with air under a pressure of 2 bars, which is constantly applied to all 132 solenoid valves which are used. The solenoid valves 2' are connected, by signal lines 3', to a computer 1'. Flexible lines 9' extend from the solenoid valves 2' to the blow head 10' and may be used to supply cool air to associated portions of the blow head 10'. That cool air is delivered from the blow head 10' through air discharge lines 11' to a main valve 14, which is constantly open to the atmosphere during normal automatic control operation. The main valve 14 is controlled via a signal line 7', which is connected to the computer 1'. A pressure-responsive switch 6' is connected to the main valve 14 and is connected by a signal line to the computer 1'.

Just as in the embodiment shown in FIG. 1, the computer 1' performs a normal program for an automatic control of the film thickness, and a testing program, which, just as in the embodiment shown in FIG. 1, causes the thickness control loop to be disabled, e.g., after an interval of two hours. The computer 1' will then perform a testing program for a short time. In that testing program, the first solenoid valve 2' on the left in FIG. 2 is initially opened and the main valve 14 is closed so that the pressure in the line 9', in the film blowing head 10' and in the line 11 will rise to 2 bars if the solenoid valve 2' operates properly and the pressure-responsive switch 6' will respond to that pressure rise and will deliver a corresponding signal via the line 8' to the computer 1' so that the latter will detect the operative condition of that first solenoid valve 2' which has been tested and of the associated line 9' and will then close the first solenoid valve 2' which has been tested and will open the main valve for a short time. That described cycle is repeated for all 132 solenoid valves 2' which are provided. After testing of the solenoid valves, the computer 1' resumes its normal program for the automatic control of the film thickness.

We claim:

1. A method of testing an operative condition of cooling sections of a slot die for making flat films of thermoplastic material comprising the steps of:

extruding the flat films of thermoplastic material;

providing said cooling sections with lines for supplying and discharging cooling air;

connecting the lines for supplying cooling air, as required, to a central cooling air feed line under superatmospheric pressure by solenoid valves controlled by an electronic computer;

interrupting extrusion of said flat films of thermoplastic material during a testing interval;

performing a testing program during the testing interval by (1) measuring a pressure in said central cooling air feed line, (2) opening one of said solenoid valves, (3) measuring a pressure drop which occurs in the central cooling air feed line upon opening of the one of said solenoid valves, the one of the solenoid valves being associated with a cooling section being tested, said pressure and said pressure drop being measured by using a pressure detector disposed in the central cooling air feed line, and (4)

generating an error signal when the pressure and the pressure drop do not correspond to values which are typically obtained in proper operation of the central cooling air feed line and of the cooling section being tested;

repeating said testing program, in succession, for all other cooling sections subsequently during the testing interval; and resuming extrusion of said flat films of thermoplastic material after all of the cooling sections have been tested and the testing interval has ended.

2. A method of testing an operative condition of cooling sections of an annular die of a blow molding extruder for making tubular films from synthetic thermoplastics comprising the steps of:

extruding the tubular films of thermoplastic material;

providing said cooling sections with lines for supplying and withdrawing cooling air;

connecting the lines for supplying cooling air to a central cooling air feed line under superatmospheric pressure by solenoid valves which are controlled by an electronic computer;

interrupting extrusion of said tubular films from synthetic thermoplastics during a testing interval;

performing a testing program, during the testing interval, in accordance with which a vent valve, associated with at least one of said lines for withdrawing cooling air, is closed and a solenoid valve, associated with a cooling section being tested, is opened by (1) providing a pressure detector which is connected to a line for withdrawing cooling air from the cooling section being tested, (2) using the pressure detector to measure a pressure rise in the at least one line for withdrawing cooling air, (3) generating an error signal if a measured pressure rise is not typical of a satisfactory function of the cooling section being tested and associated lines for supplying and withdrawing cooling air;

measuring thereafter a pressure rise in all other lines for withdrawing cooling air by venting all other lines for withdrawing cooling air and opening all other solenoid valves consecutively to test functions of associated cooling sections; and resuming extrusion of said tubular films from synthetic thermoplastics after functions of all of the cooling sections have been tested and the testing interval has ended.

* * * * *